US009507576B2

(12) United States Patent
Kawahito

(10) Patent No.: US 9,507,576 B2
(45) Date of Patent: *Nov. 29, 2016

(54) OPTIMIZING IF STATEMENTS IN COMPUTER PROGRAMMING

(71) Applicant: INTERNATIONAL BUSINESS MACHINES CORPORATION, Armonk, NY (US)

(72) Inventor: Motohiro Kawahito, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/054,589

(22) Filed: Feb. 26, 2016

(65) Prior Publication Data

US 2016/0179491 A1   Jun. 23, 2016

Related U.S. Application Data

(63) Continuation of application No. 14/748,305, filed on Jun. 24, 2015, now Pat. No. 9,298,435, which is a continuation of application No. 14/695,274, filed on May 24, 2015, now Pat. No. 9,298,434.

(30) Foreign Application Priority Data

May 9, 2014   (JP) ................. 2014-098069

(51) Int. Cl.
*G06F 9/45*      (2006.01)
*G06F 11/36*     (2006.01)

(52) U.S. Cl.
CPC ............ *G06F 8/4442* (2013.01); *G06F 8/443* (2013.01); *G06F 8/4434* (2013.01); *G06F 8/4441* (2013.01); *G06F 11/36* (2013.01); *G06F 11/3628* (2013.01)

(58) Field of Classification Search
None
See application file for complete search history.

(56) References Cited

U.S. PATENT DOCUMENTS

| 5,511,198 | A | * | 4/1996 | Hotta | G06F 8/445 717/146 |
|---|---|---|---|---|---|
| 6,011,919 | A | * | 1/2000 | Politis | G06T 11/60 717/114 |
| 6,289,507 | B1 | * | 9/2001 | Tanaka | G06F 8/443 717/155 |
| 9,298,434 | B2 | | 3/2016 | Kawahito | |
| 9,298,435 | B2 | | 3/2016 | Kawahito | |
| 2002/0042695 | A1 | * | 4/2002 | Kamiya | G06F 8/443 703/1 |
| 2002/0095667 | A1 | * | 7/2002 | Archambault | G06F 8/443 717/154 |

(Continued)

OTHER PUBLICATIONS

Steven Feuerstein et al., Oracle PL/SQL Programming, Sep. 2009, O'Reilly Media inc., 5th edition, pp. 81-89.*

(Continued)

*Primary Examiner* — Chat Do
*Assistant Examiner* — Douglas Slachta
(74) *Attorney, Agent, or Firm* — Cantor Colburn LLP; Keivan Razavi

(57) ABSTRACT

A method for optimizing if statements in a program includes obtaining, by a processing device, for each of conditional expressions of a plurality of if statements in the program, a set of conditional expressions having an inclusion relation; computing, for each of the set, a position with low execution frequency in the program as a move destination of a conditional expression having an inclusion relation, using information of the set in which the conditional expression is included; and moving the conditional expression to the computed move destination of the conditional expression.

18 Claims, 4 Drawing Sheets

(56) References Cited

U.S. PATENT DOCUMENTS

| | | | | |
|---|---|---|---|---|
| 2005/0071827 A1* | 3/2005 | Lai | G06F 8/443 | 717/146 |
| 2006/0080645 A1* | 4/2006 | Miranda | G06F 8/443 | 717/137 |
| 2010/0199354 A1* | 8/2010 | Eker | G06F 21/14 | 726/26 |
| 2010/0275190 A1* | 10/2010 | Ishizaki | G06F 8/458 | 717/149 |
| 2011/0078424 A1* | 3/2011 | Boehm | G06F 8/443 | 712/234 |
| 2012/0060142 A1* | 3/2012 | Fliess | G06F 8/70 | 717/102 |
| 2012/0158619 A1* | 6/2012 | Dani | G06N 5/025 | 706/12 |
| 2014/0012879 A1* | 1/2014 | Hamada | G06F 17/30483 | 707/780 |

OTHER PUBLICATIONS

Nicholas C. Zakas, Highe Performance Java Script, 2010, O'Reilly Media Inc., pp. 70-73.*

Minghui Yang et al., Efficient and Effective Branch Reordering Using Profile Data, Nov. 2002, ACM Transactions on Programming Languages and Systems, vol. 24 pp. 667-697.*

Peter JB King, Nested if and if-else statements, Aug. 1999.*

List of IBM Patents or Patent Applications Treated as Related; (Appendix P), Filed May 2, 2016; 2 pages.

Motohiro Kawahito, "Optimizing If Statements in Computer Programming", U.S. Appl. No. 15/045,731, filed Feb. 17, 2016.

* cited by examiner

| POSITIVE CONDITION | I == 5 | I == 20 | I == 40 |
|---|---|---|---|
| NUMBER OF EXPRESSIONS AS SUBSET | 0 | 0 | 0 |
| PROBABILITY OF CONDITION BEING TRUE | 4% | 2% | 2% |
| PROVISIONAL COST | 0.00 | 0.00 | 0.00 |
| NEGATIVE CONDITION | I != 5 | I != 20 | I != 40 |
| NUMBER OF EXPRESSIONS AS SUBSET | 2 | 2 | 2 |
| PROBABILITY OF CONDITION BEING TRUE | 96% | 98% | 98% |
| PROVISIONAL COST | 1.92 | 1.96 | 1.96 |
| TOTAL PROVISIONAL COST | 1.92 | 1.96 | 1.96 |

FIG. 3

| POSITIVE CONDITION | DD > 28 | DD > 29 | DD > 30 | DD > 31 |
|---|---|---|---|---|
| NUMBER OF EXPRESSIONS AS SUBSET | 3 | 2 | 1 | 0 |
| PROBABILITY OF CONDITION BEING TRUE | 10% | 6% | 3% | 0% |
| PROVISIONAL COST | 0.30 | 0.12 | 0.03 | 0.00 |
| NEGATIVE CONDITION | DD ≤ 28 | DD ≤ 29 | DD ≤ 30 | DD ≤ 31 |
| NUMBER OF EXPRESSIONS AS SUBSET | 0 | 1 | 2 | 3 |
| PROBABILITY OF CONDITION BEING TRUE | 90% | 94% | 97% | 100% |
| PROVISIONAL COST | 0.00 | 0.94 | 1.94 | 3.00 |
| TOTAL PROVISIONAL COST | 0.30 | 1.06 | 1.97 | 3.00 |

FIG. 4

| POSITIVE CONDITION | A < 1 | A < 5 |
|---|---|---|
| NUMBER OF EXPRESSIONS AS SUBSET | 0 | 0 |
| PROBABILITY OF CONDITION BEING TRUE | 50% | 70% |
| PROVISIONAL COST | 0.00 | 0.70 |
| NEGATIVE CONDITION | A ≥ 1 | A ≥ 5 |
| NUMBER OF EXPRESSIONS AS SUBSET | 1 | 0 |
| PROBABILITY OF CONDITION BEING TRUE | 50% | 30% |
| PROVISIONAL COST | 0.50 | 0.00 |
| TOTAL PROVISIONAL COST | 0.50 | 0.70 |

FIG. 7 (a)

(a) ORIGINAL PROGRAM　　　EXAMPLE OF EXECUTION FREQUENCY INFORMATION

```
IF TXNFL-DATE-DD > 28        (PERCENTAGE WITH WHICH CONDITION IS TRUE 10%)
    :
END-IF
    :
IF TXNFL-DATE-DD > 29        (PERCENTAGE WITH WHICH CONDITION IS TRUE 6%)
    :
END-IF
    :
IF TXNFL-DATE-DD > 30        (PERCENTAGE WITH WHICH CONDITION IS TRUE 3%)
    :
END-IF
    :
IF TXNFL-DATE-DD > 31        (PERCENTAGE WITH WHICH CONDITION IS TRUE 0%)
    :
END-IF
    :
ADD 1 TO TXNFL-DATE-DD
```

(b) EXAMPLE OF OPTIMIZATION

```
IF TXNFL-DATE-DD > 28
    T1 = TRUE
    IF TXNFL-DATE-DD > 29
        T2 = TRUE
        IF TXNFL-DATE-DD > 30
            T3 = TRUE
            IF TXNFL-DATE-DD > 31
                T4 = TRUE
            ELSE
                T4 = FALSE
            END IF
        ELSE
            T3 = FALSE
        END IF
    ELSE
        T2 = FALSE
    END IF
ELSE
    T1 = FALSE
END IF

IF T1
          :
        END-IF
          :
        IF T2
          :
        END-IF
          :
        IF T3
          :
        END-IF
          :
        IF T4
          :
        END-IF
          :
        ADD 1 TO TXNFL-DATE-DD
```

FIG. 7 (b)

OPTIMIZING IF STATEMENTS IN COMPUTER PROGRAMMING

DOMESTIC AND FOREIGN PRIORITY

This application is a continuation of U.S. patent application Ser. No. 14/748,305, filed Jun. 24, 2015, entitled "OPTIMIZING IF STATEMENTS IN COMPUTER PROGRAMMING" which in turn claims priority from U.S. patent application Ser. No. 14/695,274, filed Apr. 24, 2015, which claims priority to Japanese Patent Application No. 2014-098069, filed May 9, 2014, and all the benefits accruing therefrom under 35 U.S.C. §119, the contents of which in its entirety are herein incorporated by reference.

BACKGROUND

The present invention relates to a method for optimizing if statements in a program, and more specifically relates to a method of if statement optimization including transformation (move, cache in a variable, etc.) of conditional expressions in consideration of an inclusion relation between conditional expressions of if statements in a program.

The same if statement may be repeatedly generated when, for example, a program is machine-generated. Repeatedly executing the same if statement in such a case causes a corresponding decrease in processing performance (speed) of the program. It is therefore desirable to optimize if statements by some method, to avoid repeated execution of the same if statement in the program.

Regarding the optimization of if statements, US2007/0169039 discloses the following. In a method of converting a first intermediate representation of automatically generated code into a second intermediate representation through an optimization technique, the first intermediate representation is optimized by moving a section of code to a location where the section of code is executed or combining a plurality of loops (such as if statements) into a single loop, thus reducing the number of times a loop is executed (e.g. the number of memory accesses).

JP2012-014526 discloses a program code structure conversion apparatus that, in the case where an if statement block is present in a function call part extracted from original code and a function call is used in the conditional expression of the if statement, moves the conditional expression to a position before the if statement and temporarily assigns it to "local_cond1", and substitutes the temporarily assigned "local_cond1" in the conditional expression of the if statement, to remove the function call from the conditional expression in the if statement.

SUMMARY

In one embodiment, a method for optimizing if statements in a program includes obtaining, by a processing device, for each of conditional expressions of a plurality of if statements in the program, a set of conditional expressions having an inclusion relation; computing, for each of the set, a position with low execution frequency in the program as a move destination of a conditional expression having an inclusion relation, using information of the set in which the conditional expression is included; and moving the conditional expression to the computed move destination of the conditional expression.

In another embodiment, a non-transitory computer readable storage media has instructions stored thereon that, when executed by a computer, implements a method for optimizing if statements in a program. The method includes obtaining for each of conditional expressions of a plurality of if statements in the program, a set of conditional expressions having an inclusion relation; computing, for each of the set, a position with low execution frequency in the program as a move destination of a conditional expression having an inclusion relation, using information of the set in which the conditional expression is included; and moving the conditional expression to the computed move destination of the conditional expression.

BRIEF DESCRIPTION OF DRAWINGS

FIG. 3 is a diagram showing a set of conditional expressions in an embodiment of the present invention.

FIG. 4 is a diagram showing a set of conditional expressions in an embodiment of the present invention.

FIGS. 6(a) and 6(b) are diagrams showing an example of movement of code (conditional expression) in the set in FIG. 5.

FIGS. 7(a) and 7(b) are diagrams showing generation of if statements having an inclusion relation in an embodiment of the present invention.

DETAILED DESCRIPTION

Figure 1:
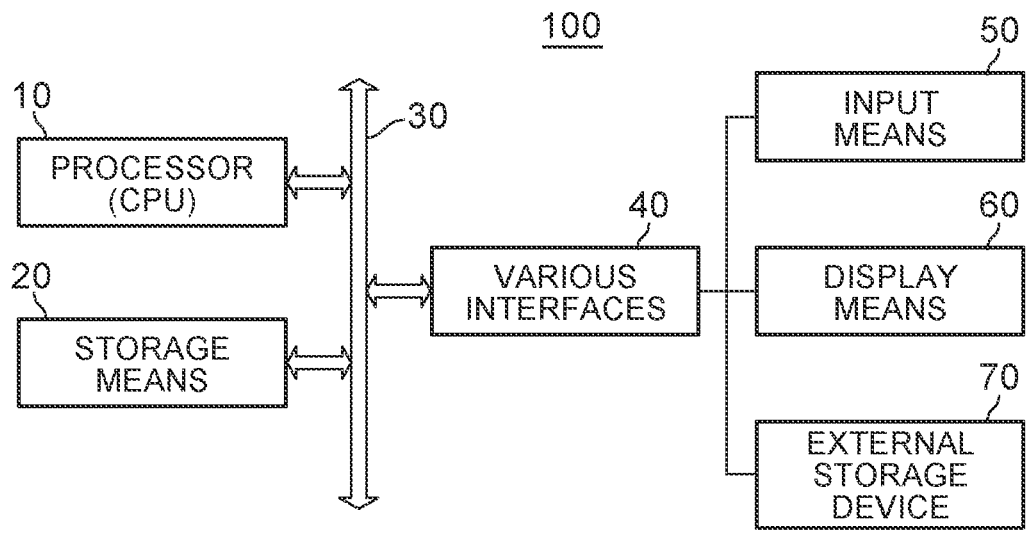
FIG. 1 is a block diagram showing a structural example of a computer for implementing a method according to an embodiment of the present invention.

The methods described above neither cover the optimization of if statements in the case where an inclusion relation exists between conditional expressions of if statements, nor sufficiently take into consideration the prediction of benefits (costs) associated with movements of conditional expressions of if statements.

Accordingly, embodiments of the invention provide for, in the case where an inclusion relation exists between conditional expressions of if statements in a program, improving the processing performance (speed) of the program by optimizing if statements while predicting the benefits (costs) associated with movements of conditional expressions.

An embodiment of present invention provides a method for optimizing if statements in a program. The method includes obtaining, for each of conditional expressions of a plurality of if statements in the program, a set of conditional expressions having an inclusion relation; computing, for each obtained set, a position with low execution frequency in the program as a move destination of a conditional expression having an inclusion relation, using information of the set in which the conditional expression is included; and moving the conditional expression to the computed move destination of the conditional expression.

In one aspect, obtaining a set includes setting a positive condition and a negative condition in each conditional expression having the inclusion relation, and computing, for each condition, a cost from the number of conditional expressions as a subset and a probability of the conditional expression being true. For example, the cost may be computed for each conditional expression, as a product of the number of conditional expressions and the probability of the conditional expression being true.

In one aspect, moving the conditional expression includes: moving a conditional expression causing no side effect, to a position with lowest execution frequency in an area in which the conditional expression has a possibility of being executed in the program; and moving a conditional expression having a possibility of causing a side effect, to a position with lowest execution frequency in an area in which the conditional expression is definitely executed and the movement causes no side effect in the program.

In one aspect, moving the conditional expression includes: in the case where a result of the conditional expression is not cached in a variable, generating an if statement relating to a conditional expression having the inclusion relation, and caching a result of the conditional expression of the if statement in a new variable; and in the case where the result of the conditional expression is cached in the variable, replacing a conditional operator of the conditional expression having the inclusion relation with a logical operator, and then caching a result of the conditional expression in the new variable.

In one aspect, generating an if statement relating to a conditional expression having the inclusion relation and caching a result of the conditional expression of the if statement in a new variable includes generating the if statement in increasing order of a total cost of the positive condition and the negative condition and caching a result of the conditional expression of the if statement in the new variable.

In one aspect, computing a position with low execution frequency in the program using information of the set in which the conditional expression is included includes performing data-flow analysis using the positive condition and the negative condition as the information of the set.

In one aspect, moving the conditional expression is performed in the case where a result of comparison between an execution cost of the conditional expression before the movement and an execution cost of the conditional expression after the movement indicates an improvement in execution speed.

The following describes an embodiment of the present invention with reference to drawings. FIG. 1 is a block diagram showing a structural example of a computer for implementing a method according to the present invention. A computer 100 includes a processor (CPU) 10, storage means 20, and various interfaces 40, which are connected to each other via a bus 30. The various interfaces 40 are a collective term for interfaces including an input interface, an output interface, an external storage interface, and an external communication interface. Each interface is connected to a corresponding one of input means 50 such as a keyboard and a mouse, display means 60 such as a CRT and an LCD, external storage means 70 such as a USB-connected semiconductor memory and an HDD, and the like. The storage means 20 may include an HDD, a semiconductor memory such as a RAM or a ROM, and the like. The method according to the present invention is implemented by the computer 100 calling and executing predetermined software stored in the storage means 20 or 70, as an example. The method according to embodiments the present invention is executed when debugging or compiling a program.

Figure 2:
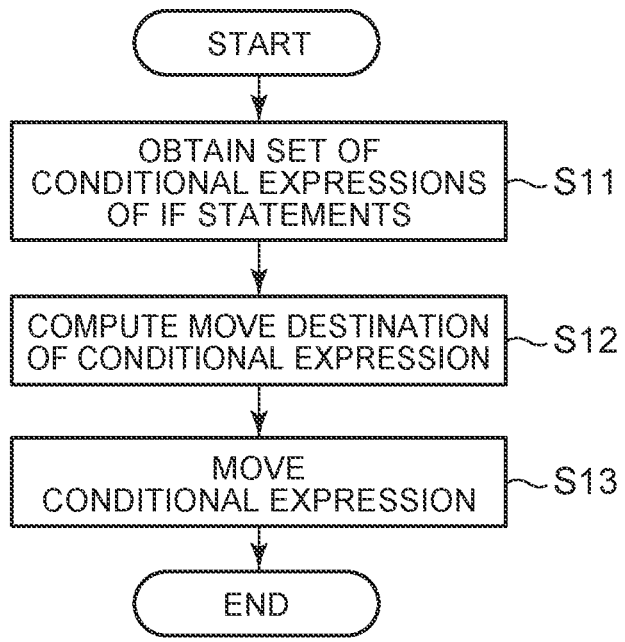
FIG. 2 is a flowchart showing the method according to an embodiment of the present invention.

The following describes process flow of the method according to the present invention, with reference to FIG. 2. FIG. 2 is a basic flowchart showing the method according to the present invention. In operation S11 in FIG. 2, for each of conditional expressions of a plurality of if statements in a program to be edited, a set of conditional expressions having an inclusion relation is obtained. When obtaining the set, a positive condition and a negative condition are set in each conditional expression having the inclusion relation, and a cost is computed for each condition from the number of conditional expressions as a subset and the probability of the conditional expression being true.

FIGS. 3 and 4 each show an example of the set obtained in operation S11. In the example in FIG. 3, three conditional expressions having an equality sign (=), namely, I=5, I=20, and I=40, are set as positive conditions, and three conditional expressions, namely, I !=5, I !=20, and I !=40, are set as the corresponding negative conditions. As an example, "I !=5" denotes that I is not equal to 5. Here, the inclusion relation of conditional expressions does not exist between the expressions of the positive conditions, but exists between the expressions of the positive and negative conditions. For example, the negative condition I !=5 has the relation of including two expressions of the positive conditions I=20 and I=40. Likewise, the negative conditions I !=20 and I !=40 have the relation of including two expressions of the positive conditions I=5 and I=40 and the relation of including two expressions of the positive conditions I=5 and I=20, respectively. The "number of expressions as subset" below the row "negative condition" in FIG. 3 indicates that the number of conditional expressions included in each negative conditional expression is 2. Since each positive condition has no inclusion relation as mentioned above, the "number of expressions as subset" below the row "positive condition" is 0 in all positive conditional expressions.

In FIG. 3, the provisional cost can be obtained by multiplying P which is the "probability of conditional expression being true" by N which is the "number of expressions as subset" (P*N). For example, the provisional cost of the negative condition I !=5 is 0.96*2=1.92. The provisional cost of each of the other conditional expressions can be computed in the same way. The total provisional cost can be obtained as the sum total of the set of positive and negative conditions. For example, the total provisional cost of I=5 and I !=5 is 0+1.92=1.92. The total provisional cost of each of the other sets of conditional expressions can be computed in the same way. The total provisional cost is used as a criterion to determine the generation order (priority) when generating the if statement in the move destination of the code (if statement), as described later.

The set in FIG. 4 can be obtained basically by the same procedure as in the case of the conditional expressions having the equality sign in FIG. 3, except that each conditional expression has an inequality sign. For example, the positive condition DD>29 has the relation of including two expressions of the positive conditions DD>30 and DD>31, and so the "number of expressions as subset" of the positive condition DD>29 is 2. Likewise, for example, the negative condition DD≤29 has the relation of including one expression of the negative condition DD≤28, and so the "number of expressions as subset" of the negative condition DD≤29 is 1. The "number of expressions as subset" of each of the other conditional expressions can be computed in the same way. The provisional cost and the total provisional cost can be computed in the same way as in FIG. 3, too. For instance, the total provisional cost obtained by summing the two provisional costs of the set of the positive condition DD>29 and the negative condition DD≤29 is 0.12+0.94=1.06.

The description refers back to FIG. 2. In operation S12, for each set obtained in operation S11, a position with low execution frequency in the program is computed as a move destination of a conditional expression having an inclusion relation, using information of the set in which the conditional expression is included. Here, the position with low execution frequency in the program can be determined by performing data-flow analysis using, as the information of the set, the expressions of positive and negative conditions mentioned above. The position may be determined using, for example, a conventional data-flow analysis algorithm (e.g. lazy code motion). To determine a final (latest) executed position from positions with the same execution frequency, conventionally each conditional expression is registered into a gen set used in data-flow equations. In this example, on the other hand, the computation is performed by incorporating the above-mentioned set of positive and negative conditions corresponding to the conditional expression into the gen set. The final executed position with the same execution frequency is a candidate for the move destination of the code (if statement, conditional expression) described later.

In operation S13, the conditional expression is moved to the computed move destination of the conditional expression. In this moving operation, an appropriate process corresponding to each case (condition) is performed as shown in the following (a) to (c), to actually improve the processing performance (speed) of the program.

(a) In the moving operation, in the case where the conditional expression causes no side effect, the conditional expression is moved to a position with lowest execution frequency in an area in which the conditional expression has a possibility of being executed in the program. After this, the conditional expression is executed, and the result (0 or 1) is cached (stored) in a variable. The position with lowest execution frequency is computed using the data-flow equations mentioned above. The side effect typically means that a function in the program changes the logical state of the computer and affects the subsequently obtained results. A representative example is that, in assignment of a value to a variable, the value of the variable changes. In the case where the conditional expression has a possibility of causing a side effect, the conditional expression is moved to a position with lowest execution frequency in an area in which the conditional expression is definitely executed and the movement causes no side effect in the program. After this, the conditional expression is executed, and the result (0 or 1) is cached (stored) in the variable.

(b) In the operation of moving the conditional expression, in the case where the result of the moved conditional expression is not cached in a variable, when the conditional expression is in an inclusion relation with any conditional expression, an if statement relating to the conditional expression having the inclusion relation is generated, and the result of the conditional expression is cached in a new variable. When doing so, the if statement is generated in increasing order of the total provisional cost of the positive and negative conditions in the set, and the result is cached in the new variable. In the case where the result of the conditional expression is cached in the variable, on the other hand, the conditional operator (conditional AND, OR, XOR) of the conditional expression having the inclusion relation is replaced with a logical operator (logical AND, OR, XOR), and then the result of the conditional expression is cached in the new variable.

(c) The operation of moving the conditional expression is enabled in the case where the result of comparison between the execution cost of the conditional expression before the movement and the execution cost of the conditional expression after the movement indicates an improvement in execution speed. In detail, cost-benefit computation is performed for the conditional expression optimized through the movement and, in the case where a benefit is greater than a predetermined threshold, the conditional expression is replaced with a computed variable or a cached variable. Otherwise, the transformation (move, generate, or cache the conditional expression in a variable) in the above-mentioned (a) and (b) is not performed. A method by which, without actually executing the transformation in the above-mentioned (a) and (b) until the cost computation and evaluation, the information of the transformation is stored in a memory can thus be employed.

The reason for the need of cost-benefit computation can be explained as follows. In the optimization of if statements, a conditional expression is often unable to be completely deleted even after optimization and the speed might decrease, unlike the optimization of computational expressions. This requires cost computation. Whether or not the speed is increased depends on the total execution frequency of the optimized conditional expression, the cost of the conditional expression, the total execution frequency of the inserted conditional expression, and the access cost of the cached variable. For example, the optimization of if statements differs from the optimization of computational expressions as shown below.

(A) Optimization of computational expressions:

| (1) Original program | (2) After optimization |
|---|---|
| a = b + c | T = b + c |
| | a = T |
| . | . |
| . | . |
| . | . |
| d = b + c | d = T |

(B) Optimization of if statements:

| (1) Original program | (2) After optimization |
|---|---|
| | T = (cond) |
| if cond | IF T |
| . | . |
| . | . |
| . | . |
| if cond | IF T |

The cost of (1) is $C1*2$, the cost of (2) is $C1+C2*3$, and the benefit is $C1-C2*3$, where the cost of the conditional expression cond is $C1$ and the cost of memory access to T is $C2$. The optimization is performed when the benefit is greater than the predetermined threshold.

EXAMPLE 1

Figures 5, 6:
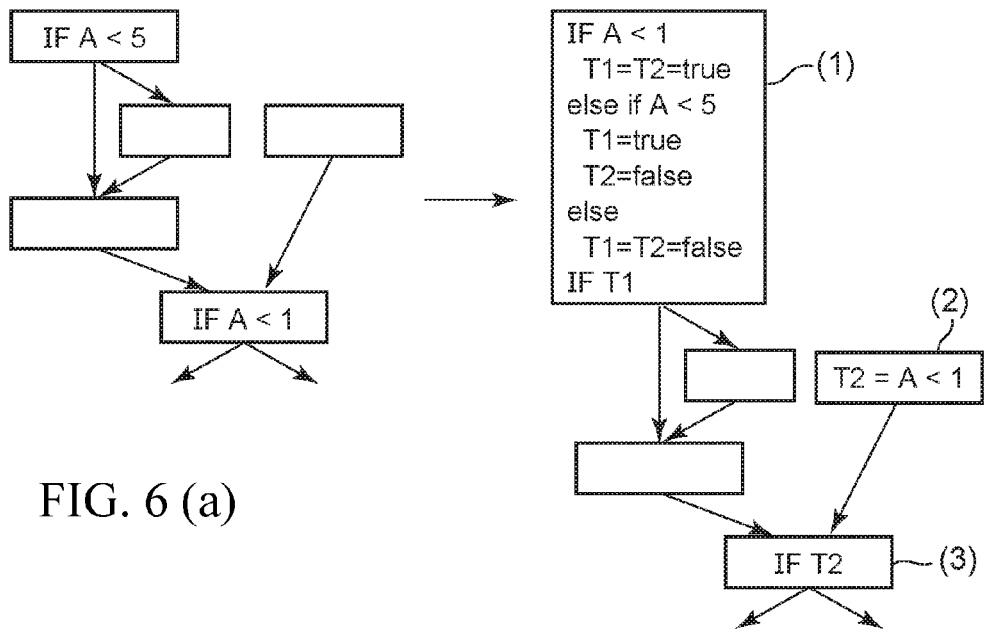
FIG. 5 is a diagram showing a set of conditional expressions in an embodiment of the present invention.

FIGS. 5 and 6 show an example of code (conditional expression) movement in consideration of an inclusion relation between conditional expressions based on the process flow in FIG. 2 described above. FIG. 5 shows a set for conditional expressions A<1 and A<5. The meaning of each parameter in the set has been described with reference to FIGS. 3 and 4. FIG. 6 shows an example of code movement for the set in FIG. 5. In FIG. 6, (a) shows an example of code movement according to a conventional code movement algorithm, and (b) shows an example of code movement according to the present invention. In the conventional example in (a), the two conditional expressions (A<1 and A<5) are not optimized, that is, the processing amount is not reduced (the speed is not increased). In the example of the present invention in (b), on the other hand, the two conditional expressions (A<1 and A<5) are optimized as a result of the generation of new code (if statement) in (1) to (3).

In the example in FIG. 6,
the original cost: 1.5*C1
the cost after optimization: 1.25*C1+2*C2
the benefit of optimization: 0.25*C1−2*C2,
where the cost of memory access to A is C1, the cost of memory access to T is C2, the probability of A<1 being true is 50%, and the probability of the left path being executed is 50%. The transformation is enabled in the case where the benefit of optimization (0.25*C1−2*C2) is greater than the predetermined threshold.

EXAMPLE 2

FIG. 7 shows an example of generating if statements having an inclusion relation based on the process flow in FIG. 2 described above. In FIG. 7, (a) shows code in the original program, and (b) shows code after optimization (move, transform) according to the present invention. In this case,
the cost in (a): 4*C1
the cost in (b): 1.11*C1+8*C2
the benefit of optimization: 2.89*C1−8*C2,
where the cost of comparison with TXNFL-DATE-DD is C1 and the cost of memory access to a temporary variable is C2. The transformation (code movement) is enabled in the case where the benefit of optimization (2.89*C1−8*C2) is greater than the predetermined threshold.

EXAMPLE 3

1. Example of Optimization of Conditional Expression Causing No Side Effect

An example of optimization in the case where there are four occurrences of the following if statement:
IF R-RESTOCK-01 OF REPORT-RESTOCK OF REPORT-BMO5=SPACE
OR R-RESTOCK-01 OF REPORT-RESTOCK OF REPORT-BMO5=LOW-VALUE
is given below. The following instruction sequence is generated for the above-mentioned if statement. In this case, the number of memory accesses is large and the cost is high.
L 4,312(0,9)
CLC 304(12,4),12(12)
BC 8,2612(0,11)
CLI 304(4),X'00'
BC 7,2620(0,11)
CLC 305(11,4),304(4)
BC 7,2620(0,11).

It is assumed that the two conditional expressions included here cause no side effect, and the value is unchanged between the if statements. The transformation is performed as follows, by the method according to the present invention.
Cond1=(R-RESTOCK-01 OF REPORT-RESTOCK OF REPORT-BMO5=SPACE)
Cond2=(R-RESTOCK-01 OF REPORT-RESTOCK OF REPORT-BMO5=LOW-VALUE)
Cond3=Cond1|Cond2//Speed up conditional OR by logical OR.

The benefit of optimization in this case is determined to be greater than the predetermined threshold, and the four if statements are replaced with the conditional expression of Cond3.

IF Cond3 process 1
process 2
IF Cond3 process 3
process 4
IF Cond3 process 5
process 6
IF Cond3 process 7.

2. Example of Optimization of Conditional Expression Having Possibility of Causing Side Effect Suppose the second conditional expression (R-RESTOCK . . . ) of the if statement in the above 1. can cause an access exception. In such a case, the following transformation is performed in the moving operation in (b) mentioned above.

```
Cond1 = (R-RESTOCK-01 OF REPORT-RESTOCK OF
REPORT-BMO5 = SPACE)
    IF Cond1 OR
        R-RESTOCK-01 OF REPORT-RESTOCK OF
REPORT-BMO5 = LOW-VALUE
        Cond3 = 1
    ELSE
        Cond3 = 0
    END-IF.
```

EXAMPLE 4

Regarding the generation example of the if statements having the inclusion relation in FIG. 7, the original program and the optimized program were generated in a source code level, and their processing (execution) speeds were examined. The result demonstrated that the optimized program shows an improvement in speed of about 40% as compared with the original program.

Though the embodiment of the present invention has been described with reference to drawings, the present invention is not limited to such an embodiment. Various improvements, modifications, and changes may be made based on the knowledge of those skilled in the art without departing from the scope of the present invention.

REFERENCE SIGNS LIST

| | |
|---|---|
| 30 | bus |
| 100 | computer |

What is claimed is:

1. A non-transitory computer readable storage media having instructions stored thereon that, when executed by a computer, implement a method for optimizing if statements in a program, the method comprising:
identifying a conditional expression having an inclusion relation corresponding to a plurality of conditional statements in the program, wherein a result of the conditional expression is representative of a result of the plurality of conditional statements respectively; and
moving the conditional expression to a move destination in the program, wherein the move destination is determined by performing a data-flow analysis using expressions of positive and negative conditions of the conditional expression, and wherein moving the conditional expression comprises:

in the case where a result of the conditional expression is not cached in a variable, generating an if statement for the conditional expression and caching a result of the conditional expression in a new variable, wherein the if statement is generated in increasing order of a cost of execution; and in the case where the result of the conditional expression is cached in the variable, replacing a conditional operator of the conditional expression with a logical operator, prior to caching the result in the new variable, in response to the result of the conditional expression being cached in a variable.

2. The non-transitory computer readable storage media of claim 1, wherein the method further comprises determining the cost of execution of the program with the conditional expression being moved to a move destination, wherein the cost of execution is based on a number of conditional statements corresponding to the inclusion relation, and a cost to access memory.

3. The non-transitory computer readable storage media of claim 2, wherein determining the cost of execution of the program with the conditional expression moved to the move destination comprises:

determining a first provisional cost corresponding to the conditional expression being positive; and determining a second provisional cost corresponding to the conditional expression being negative, wherein the cost is a sum of the first provisional cost and the second provisional cost.

4. The non-transitory computer readable storage media of claim 3, wherein the first provisional cost is based on a number of conditional expressions being true in response to the conditional expression being positive, and the second provisional cost is based on a number of conditional expressions being true in response to the conditional expression being negative.

5. The non-transitory computer readable storage media of claim 3, wherein the first provisional cost is computed for the conditional expression as a product of a number of expressions being true in response to the conditional expression being positive, and a probability of the conditional expression being true; and the second provisional cost is computed for the conditional expression as a product of a number of expressions being true in response to the conditional expression being negative, and a probability of the conditional expression being false.

6. The non-transitory computer readable storage media of claim 1, wherein the data-flow analysis comprises:

in response to the conditional expression not affecting a part of the program beyond a scope of the conditional statement that includes the conditional expression, the move destination is an area in which the conditional expression has a possibility of being executed in the program based on the result of the conditional statement; and in response to the conditional expression affecting a part of the program beyond the scope of the conditional statement that includes the conditional expression, the move destination is an area in which the conditional expression is definitely executed.

7. The non-transitory computer readable storage media of claim 1, wherein moving the conditional expression is performed in response to a result of a comparison between an execution cost of the conditional expression before the movement and an execution cost of the conditional expression after the movement indicates an improvement in execution speed.

8. A computer-implemented method for optimizing conditional statements in a program, the method comprising:

identifying a conditional expression having an inclusion relation corresponding to a plurality of conditional statements in the program, wherein a result of the conditional expression is representative of a result of the plurality of conditional statements respectively; and moving the conditional expression to a move destination in the program, wherein the move destination is determined by performing a data-flow analysis using expressions of positive conditions and negative conditions of the plurality of the conditional statements, and wherein moving the conditional expression comprises:

in the case where a result of the conditional expression is not cached in a variable, generating an if statement for the conditional expression and caching a result of the conditional expression in a new variable, wherein the if statement is generated in increasing order of a cost of execution; and in the case where the result of the conditional expression is cached in the variable, replacing a conditional operator of the conditional expression with a logical operator, prior to caching the result in the new variable, in response to the result of the conditional expression being cached in a variable.

9. The computer-implemented method of claim 8, wherein the method further comprises determining the cost of execution of the program with the conditional expression being moved to a move destination, wherein the cost of execution is based on a number of conditional statements corresponding to the inclusion relation, and a cost to access memory.

10. The computer-implemented method of claim 9, wherein determining the cost of execution of the program with the conditional expression moved to the move destination comprises:

determining a first provisional cost corresponding to the conditional expression being positive; and determining a second provisional cost corresponding to the conditional expression being negative, wherein the cost is a sum of the first provisional cost and the second provisional cost.

11. The computer implemented method of claim 10, wherein the first provisional cost is based on a number of conditional expressions being true in response to the conditional expression being positive, and the second provisional cost is based on a number of conditional expressions being true in response to the conditional expression being negative.

12. The computer implemented method of claim 10, wherein the first provisional cost is computed for the conditional expression as a product of a number of expressions being true in response to the conditional expression being positive, and a probability of the conditional expression being true; and the second provisional cost is computed for the conditional expression as a product of a number of expressions being true in response to the conditional expression being negative, and a probability of the conditional expression being false.

13. The computer-implemented method of claim 8, wherein the data-flow analysis comprises:

in response to the conditional expression not affecting a part of the program beyond a scope of the conditional statement that includes the conditional expression, the move destination is an area in which the conditional expression has a possibility of being executed in the program based on the result of the conditional statement; and in response to the conditional expression affecting a part of the program beyond the scope of the conditional statement that includes the conditional expression, the move destination is an area in which the conditional expression is definitely executed.

14. The computer-implemented method of claim 8, wherein moving the conditional expression is performed in response to a result of a comparison between an execution cost of the conditional expression before the movement and an execution cost of the conditional expression after the movement indicates an improvement in execution speed.

15. A system for optimizing conditional statements in a program, the system comprising a hardware processor configured to implement a method comprising:

identifying a conditional expression having an inclusion relation corresponding to a plurality of conditional statements in the program, wherein a result of the conditional expression is representative of a result of the plurality of conditional statements respectively; and moving the conditional expression to a move destination in the program, wherein the move destination is determined by performing a data-flow analysis using positive and negative conditions of the plurality of conditional statements, and wherein moving the conditional expression comprises:

in the case where a result of the conditional expression is not cached in a variable, generating an if statement for the conditional expression and caching a result of the conditional expression in a new variable, wherein the if statement is generated in increasing order of a cost of execution of the program; and in the case where the result of the conditional expression is cached in the variable, replacing a conditional operator of the conditional expression with a logical operator, prior to caching the result in the new variable, in response to the result of the conditional expression being cached in a variable.

16. The system of claim 15, wherein the method further comprises determining the cost of execution of the program with the conditional expression being moved to a move destination, wherein the cost of execution is based on a number of conditional statements corresponding to the inclusion relation, and a cost to access memory.

17. The system of claim 16, wherein determining the cost of execution of the program with the conditional expression moved to the move destination comprises:

determining a first provisional cost corresponding to the conditional expression being positive; and determining a second provisional cost corresponding to the conditional expression being negative, wherein the cost is a sum of the first provisional cost and the second provisional cost.

18. The system of claim 17, wherein the first provisional cost is based on a number of conditional expressions being true in response to the conditional expression being positive, and the second provisional cost is based on a number of conditional expressions being true in response to the conditional expression being negative.

* * * * *